US006732780B1

United States Patent
Gayoso

(10) Patent No.: US 6,732,780 B1
(45) Date of Patent: May 11, 2004

(54) PRINT MEDIA COATING DEVICE

(75) Inventor: Maximo Gayoso, Guadalajara Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 6 days.

(21) Appl. No.: 10/280,553

(22) Filed: Oct. 25, 2002

(51) Int. Cl.[7] .................. B32B 31/20; B30B 15/34; B44C 1/165; B41M 3/12
(52) U.S. Cl. .................. 156/540; 156/543; 156/555; 156/583.1; 156/584; 156/247; 156/344; 427/209; 428/200; 428/343; 428/914; 428/40.1
(58) Field of Search .................. 156/230, 238, 156/247, 289, 344, 540, 543, 558, 535, 580, 582, 585.1, 584; 427/146, 147, 148, 209; 428/40.1, 41.8, 42.2, 42.3, 195, 200, 202, 343, 552, 914

(56) References Cited

U.S. PATENT DOCUMENTS

| | | | | |
|---|---|---|---|---|
| 3,415,705 A | * | 12/1968 | Ettre .......................... | 156/540 |
| 3,547,730 A | * | 12/1970 | Cohen et al. ................ | 156/540 |
| 4,075,051 A | * | 2/1978 | Brzozowski ................ | 156/236 |
| 4,338,152 A | * | 7/1982 | Del Bianco et al. ........ | 156/351 |
| 4,405,394 A | * | 9/1983 | Cohen ......................... | 156/238 |
| 4,495,014 A | * | 1/1985 | Gebrian et al. ............. | 156/238 |
| 4,714,504 A | * | 12/1987 | Cummings et al. ........... | 156/64 |
| 4,738,555 A | | 4/1988 | Nagashima .................. | 400/240 |
| 5,370,960 A | | 12/1994 | Cahill et al. ................. | 430/124 |
| 5,571,368 A | * | 11/1996 | Barge ......................... | 156/359 |
| 5,582,669 A | | 12/1996 | Gove et al. .................. | 156/239 |
| 5,714,305 A | | 2/1998 | Teng et al. ............... | 430/271.1 |
| 6,475,322 B1 | * | 11/2002 | Ledak ......................... | 156/238 |

* cited by examiner

Primary Examiner—J. A. Lorengo

(57) ABSTRACT

One embodiment is directed to a print media coating device that includes first and second web supplies, first and second web take-ups, and a fuser defining a print media path therethrough. The first web supply and the first web take-up are positioned on one side of the media path and the second web supply and the second web take-up are positioned on the other side of the media path opposite the first web supply and the first web take-up. A first coating material web runs from the first web supply, along the media path through the fuser, to the first web take-up and a second coating material web runs from the second web supply, along the media path through the fuser, to the second web take-up. A first peel bar is positioned immediately adjacent to the print media path, downstream from the fuser on the first side of the media path. A second peel bar is positioned immediately adjacent to the print media path downstream from the fuser and downstream from the first peel bar.

18 Claims, 8 Drawing Sheets

PRINT MEDIA COATING DEVICE

FIELD OF THE INVENTION

The invention is directed to print media coating devices and methods.

BACKGROUND

It is sometimes desirable to coat printed media with a film of clear flexible material. Such coatings can be formulated and applied to help protect the printed image, enhance the printed image or provide a more uniform gloss level across the entire media (including both printed and unprinted areas).

Duplex printing, in which printed images are applied to both sides of a sheet of paper or other print media, is now very common. Many printers, copiers, multi-function peripherals and other printing devices offer duplex printing. Where a coating is desired on both sides of a sheet, such as might be the case with duplex printing, the sheet must pass twice through the coating module of a post print finishing device—once to coat the top of the sheet and once to coat the bottom of the sheet.

The patent application filed on Oct. 25, 2002 under and entitled "Print Media Coating Device and Method" describes devices and methods for simultaneously coating both sides of printed media with a flexible film. For conventional single side coating, as well as the new two-side coating described in the '897 patent application, it is desirable to use a peel bar to help separate the film carrier from the film after the film is applied to the media. Coatings are applied to print media by overlaying on the media a multi-layered web containing the coating material and then applying heat and pressure to fuse the coating material to the media. The web includes a film/layer of coating material, a carrier (sometimes called a backing), and a release layer in between the coating material and the carrier.

In a conventional single side coating device such as the one illustrated in FIG. 11, the peel bar 2 protrudes slightly into media path 3 downstream from fuser 4 to apply pressure to coating material web 5. Web 5 is threaded through fuser 4 from a supply spool 6 to a take-up spool 7. Coating material web 5 and media sheet 8 are sandwiched together through fuser 4 with the coating material film part of web 5 facing sheet 8. Fuser 4 applies heat and pressure to the web/sheet sandwich to affix the coating material film to the sheet 8. The carrier portion of web 5 angles up off peel bar 2 to take-up spool 7. The point pressure applied by peel bar 2 to web 5 helps the carrier portion of web 5 separate more cleanly from the coating film, now affixed to sheet 8.

In one design of the new two-side coating device, the peel bars are placed directly opposite one another across the media path so that each carrier is peeled away from the coating film at the same time. During the development and testing of this design, it was discovered that the adhesion between the carrier and the coating film is such that each web tends to pull on the sheet as the carrier peels away from the coating film. This pull is not always the same on each side of the sheet. One side pulling harder than the other tends to relieve pressure on the weak side peel bar. This pressure relief can impede separation between the carrier and the coating film on the weak side which can, in turn, effect the quality of the coating film retained on that side of the sheet. Accordingly, the present invention was developed in an effort to maintain a more uniform pressure on each peel bar as a way to improve carrier/coating film separation.

SUMMARY

One embodiment of the present invention is directed to a print media coating device that includes first and second web supplies, first and second web take-ups, and a fuser defining a print media path therethrough. The first web supply and the first web take-up are positioned on one side of the media path and the second web supply and the second web take-up are positioned on the other side of the media path opposite the first web supply and the first web take-up. A first coating material web runs from the first web supply, along the media path through the fuser, to the first web take-up and a second coating material web runs from the second web supply, along the media path through the fuser, to the second web take-up. A first peel bar is positioned immediately adjacent to the print media path, downstream from the fuser on the first side of the media path. A second peel bar is positioned immediately adjacent to the print media path downstream from the fuser and downstream from the first peel bar.

Another embodiment of the invention is directed to a method for coating print media that includes: providing first and second coating material webs, each web having a coating material and a carrier carrying the coating material; sandwiching the print media between the first and second coating material webs; fusing coating material to the print media; and peeling the carrier from the coating material on the first coating material web and then peeling the carrier from the coating material on the second coating material web.

DETAILED DESCRIPTION

Figure 1:
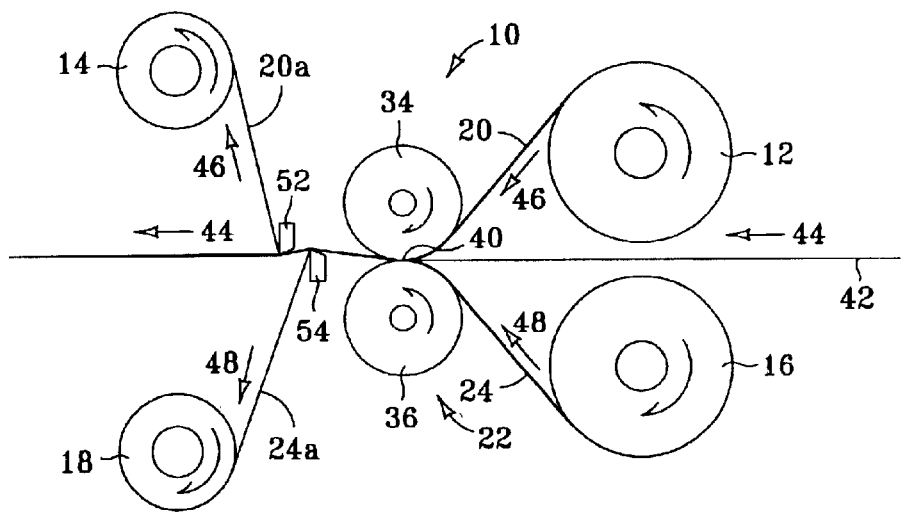
FIG. 1 illustrates a device for simultaneously coating both sides of a sheet of print media according to one embodiment of the invention.

FIG. 1 illustrates a device for simultaneously coating both sides of a sheet of print media according to one embodiment of the invention. Referring to FIG. 1, coating device 10 includes first/top side coating material web supply and web take-up spools 12 and 14, respectively and second/bottom side coating material supply and take-up spools 16 and 18, respectively. A first/top side coating material web 20 runs from top supply spool 12 through a fuser 22 to top take-up spool 14. A second/bottom side coating material web 24 runs from bottom web supply spool 16 through fuser 22 to bottom web take-up spool 18. Webs 20 and 24 represent generally any web that carries a coating film suitable for use with paper and other types of print media.

Figure 2:
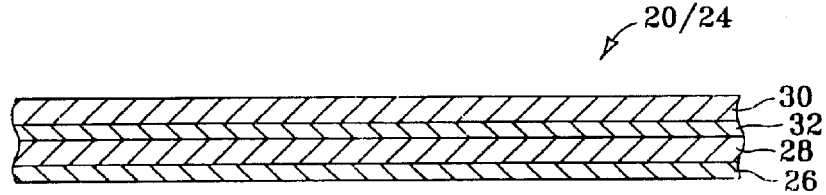
FIG. 2 illustrates a typical coating material web.

FIG. 2 is a section view illustrating a typical web suitable for use in coating device 10. Referring to FIG. 2, web 20/24 includes a layer of adhesive material 26, a layer of coating material 28 on adhesive layer 26, a carrier 30 (or backing as it is sometimes called) and a release layer 32 interposed between carrier 30 and coating material 28. Suitable webs include, for example, the clear flexible film webs described in pending Hewlett-Packard patent application Ser. No. 10/167,891, filed Jun. 11, 2002 and entitled "Images Printed On Porous Media And Coated With A Thermal Transfer Overcoat."

Fuser 22 represents generally any suitable device for applying heat or pressure or both to the web/media sandwich to cause coating 28 to bond to the paper or other print media. In the embodiment illustrated in FIG. 1, fuser 22 includes a pair of opposing rollers 34 and 36 that rotate against one another to form a fuser nip 40. A conventional fuser such as the roll-type fuser used in a laser printer may be adapted for use as fuser 22 in coating device 10. In one example of such a fuser, which is shown in FIG. 1 and in more detail in FIG. 6, roller 34 is constructed as a heated fuser roller and roller 36 is constructed as a compliant pressure roller.

Downstream from fuser 22, each web 20, 24 passes over a peel bar 52, 54. Each peel bar 52 and 54 extends across the width of the web and protrudes slightly into the web path. That is to say, top take-up spool 14, top peel bar 52 and fuser 22 are positioned relative to one another such that web 20 bends around peel bar 52 on its way to top take-up spool 12. Similarly, bottom take-up spool 18, bottom peel bar 54 and fuser 22 are positioned relative to one another such that web 24 bends around bottom peel bar 54 on its way to bottom take-up spool 18. Each web path 46 and 48 diverges from media path 44 at peel bars 52 and 54 at a sharp angle, preferably 60° to 130° and most preferably about 90°, to help carrier 30 separate more cleanly away from coating layer 28. Peel bars 52 and 54 are not aligned directly opposite one another across the web/media path. Rather, one peel bar is positioned downstream from the other peel bar to help improve carrier/coating separation.

Figure 6:
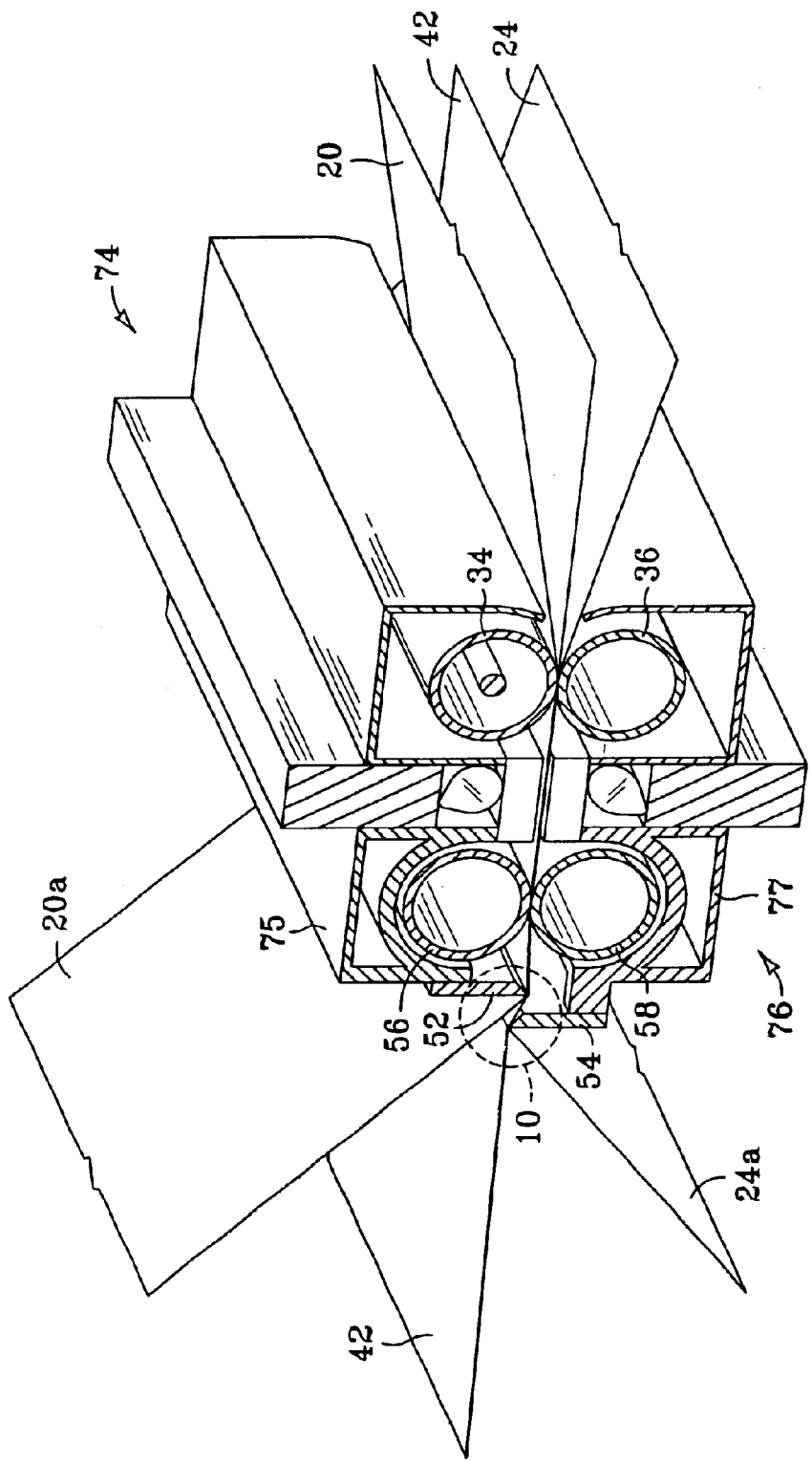
FIG. 6 illustrates the fuser and cooler module and peel bars of a coating device such as the one shown in FIG. 4.

When a coating across the full width of the paper or other print media 42 is desired, as will typically be the case, each web 20 and 24 and the corresponding supply and take-up spools are about the same width as the print media, as best seen in FIG. 6. Print media sheet 42 moves through fuser 22 along a media path 44. Top web 20 moves from top web supply spool 12 through fuser 22 to top web take-up spool 14 along a first/top web path 46. Bottom web 24 moves from bottom web supply spool 16 through fuser 22 to bottom web take-up spool 18 along a second/bottom web path 48. Print media path 44 and web paths 46 and 48 converge at fuser nip 40, are coincident with one another through fuser 22 as coating 28 from each web is applied to the top and bottom of print media sheet 42, and then diverge as each now spent web 20a and 24a is taken up by take-up spools 14 and 18. The combination of heat and pressure applied to webs 20 and 24 and media sheet 42, as they pass through fuser nip 40, melts adhesive layers 26 (FIG. 2) into sheet 42 to bond coating 28 to the top and bottom of the sheet 42 and softens release layer 32 to allow carrier layer 30 to be removed more easily from coating layer 28. Spent webs 20a and 24a, taken up on spools 14 and 18, consist of carriers 30 and the remnants of release layers 32.

Figure 3:
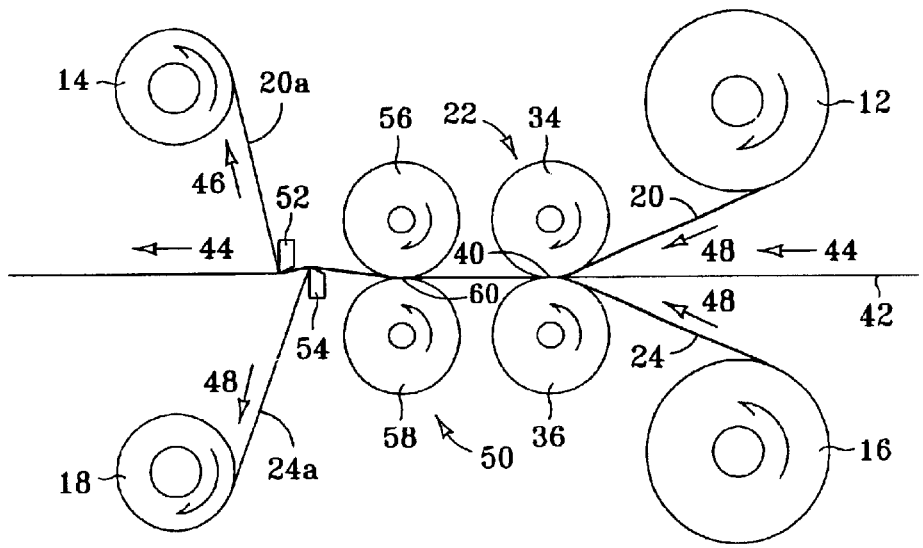
FIG. 3 illustrates a device for simultaneously coating both sides of a sheet of print media according to one embodiment of the invention in which the device includes cooling rollers and peel bars.
Figure 4:
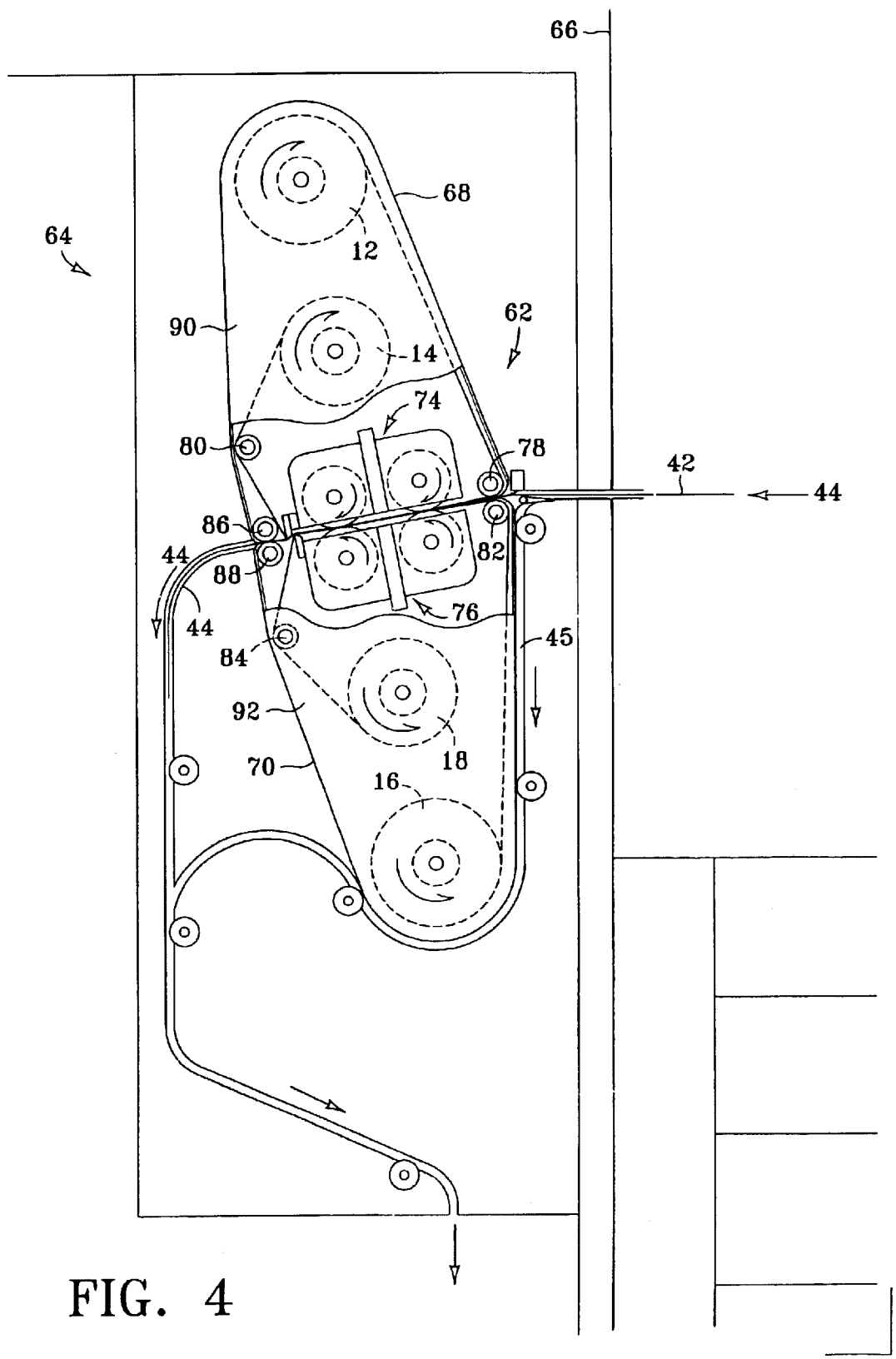
FIG. 4 illustrates a modular coating device according to one embodiment of the invention installed in a post print-finishing device.

In the coating device illustrated in FIG. 3, webs 20 and 24 and sheet 42 pass through a cooler 50 located downstream from fuser 22 and then over peel bars 52 and 54 downstream from cooler 50. Print media path 44 and web paths 46 and 48 converge at fuser nip 40, are coincident with one another through fuser 22 and cooler 50, and then diverge at peel bars 52 and 54 as each now spent web 20a and 24a is taken up by take-up spools 14 and 18. Cooler 50 cools webs 20 and 24 and sheet 42 to accelerate the curing of the bond between the coating layers 28 and sheet 42. Accelerated curing strengthens the bond between coating 28 and sheet 42 and allows carrier 30 to separate more cleanly from coating 28 at peel bars 52 and 54.

In the embodiment of FIG. 3, cooler 50 is constructed as a pair of opposing cooler rollers 56 and 58 that rotate against one another to form a cooler nip 60. Cooler 50 may cool passively as a heat sink, in which case cooler rollers 56 and 58 are constructed as a relatively large mass of thermally conductive material. Alternatively, one or both cooler rollers 56 and 58 are actively cooled so that cooler 50 actively cools the web/sheet sandwich as it passes between cooler rollers 56 and 58.

Downstream from cooler 50, each web 20, 24 passes over a peel bar 52, 54. Each peel bar 52 and 54 extends across the width of the web and protrudes slightly into the web path. Each web path 46 and 48 diverges from media path 44 at peel bars 53 and 54 at a sharp angle, preferably 60° to 130° and most preferably about 90°, to help carrier 30 separate more cleanly away from coating layer 28. In the embodiment of FIG. 3, peel bars 52 and 54 are not aligned directly opposite one another across the web/media path. It has been discovered that the staggered configuration shown in FIG. 3, in which one peel bar is located downstream from the other peel bar, helps improve carrier/coating separation.

In an alternative configuration in which the peel bars are placed directly opposite one another, each carrier 30 is peeled away from coating layer 28 at the same time. It was discovered during testing of this alternative configuration that the adhesion between carrier 30 and coating 28 is such that each web 20 and 24 tends to pull on media sheet 42 as carrier 30 peels away from coating 28. This pull is not always the same on each side of sheet 42. One side pulling harder than the other tends to relieve pressure on the weak side peel bar. This pressure relief can impede separation between carrier 30 and coating 28 on the weak side that can, in turn, affect the quality of the coating retained on that side of sheet 42. Hence, the staggered configuration for peel bars 52 and 54 is preferred over the aligned configuration.

In this staggered configuration, media sheet 42 reaches the upstream peel bar 54 where peeling carrier 30 from bottom web 24 is initiated at a first point in time. As sheet 42 reaches the downstream peel bar 52, peeling carrier 30 from top web 20 is initiated at a second later point in time.

Figure 5:
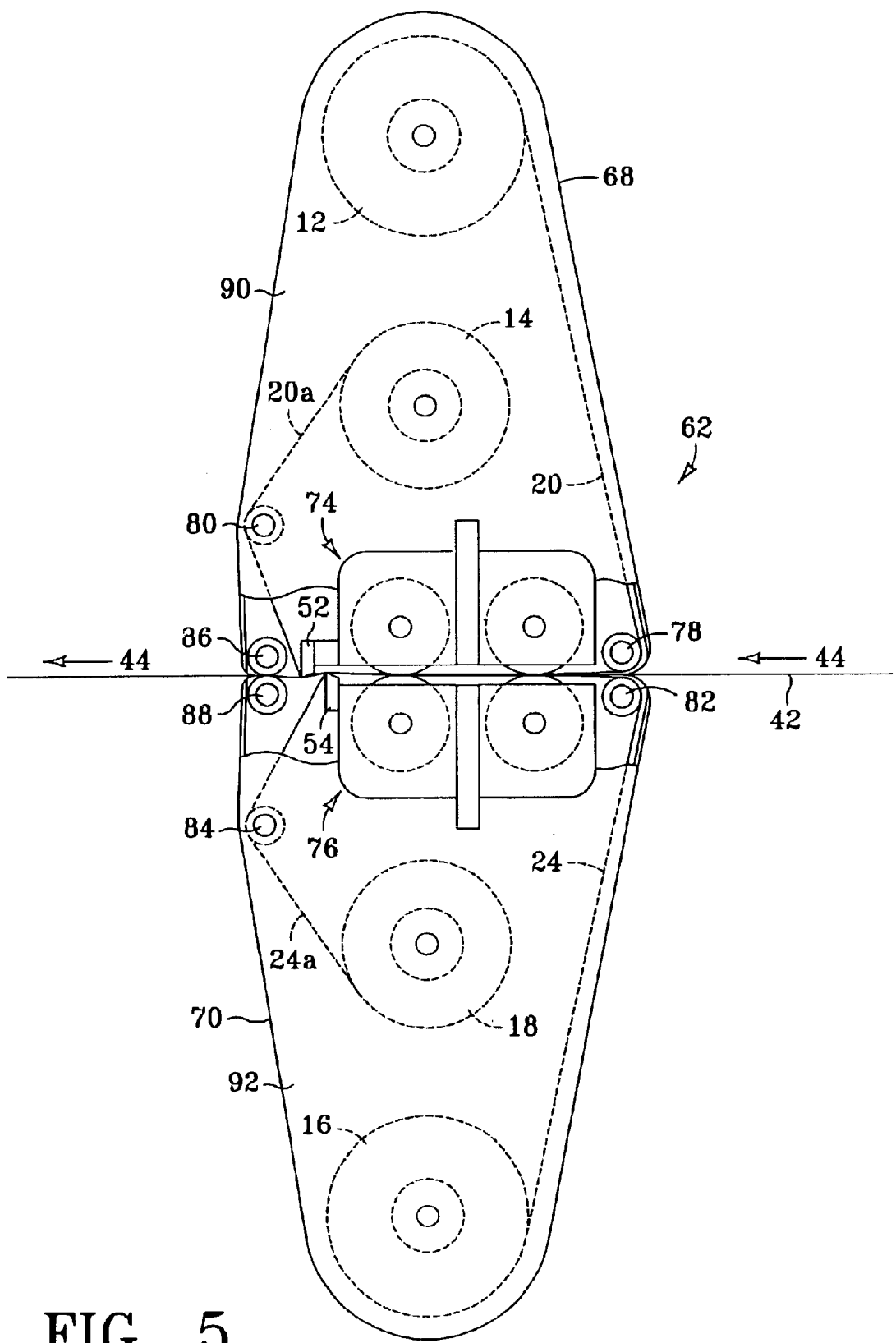
FIG. 5 is a more detailed illustration of a coating device such as the one shown in FIG. 4.
Figure 7:
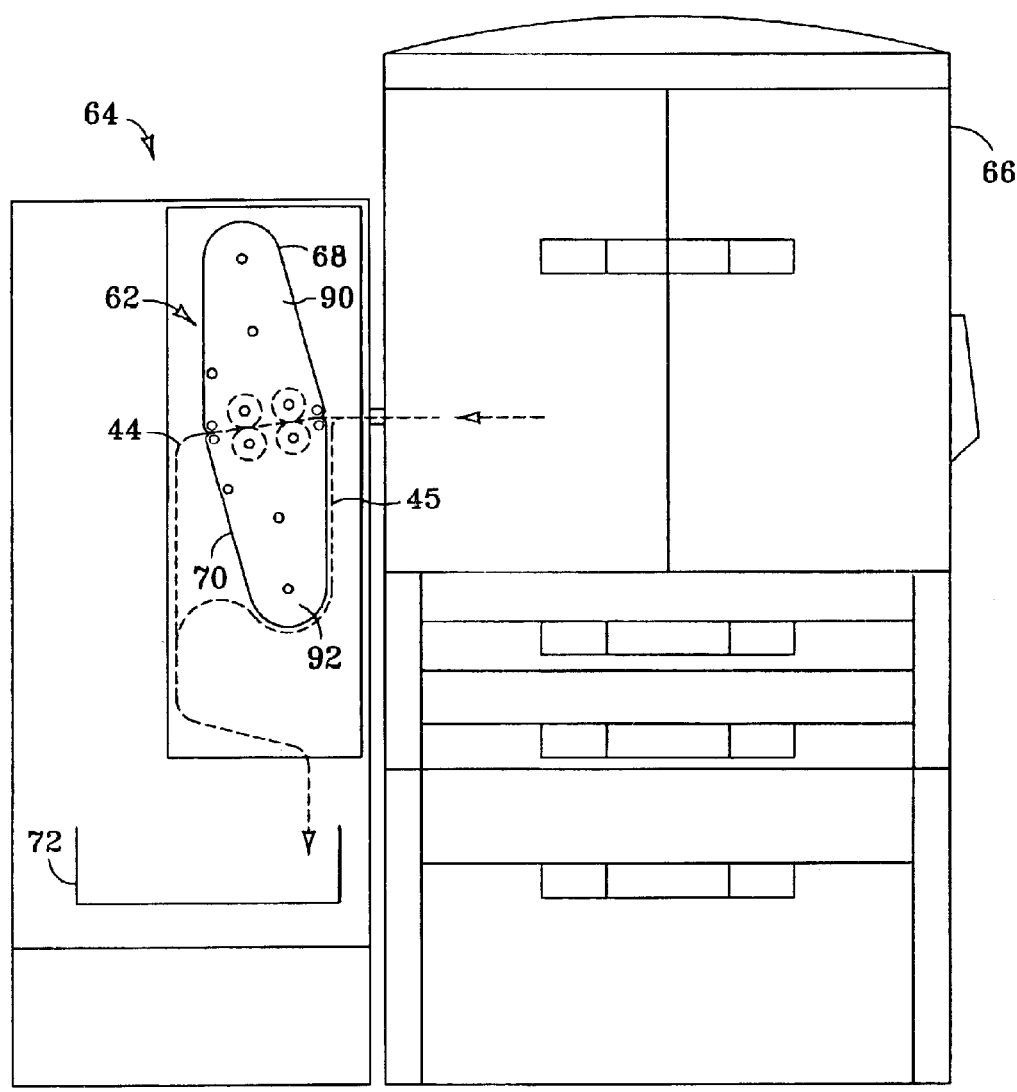
FIG. 7 illustrates a modular coating device according to one embodiment of the invention installed in a post print-finishing device attached to a printer.

FIGS. 4–7 illustrate a modular coating device 62 installed in a post-print finishing device 64 operatively coupled to a printer 66. FIG. 5 is an enlarged view of coating device 62 and FIG. 6 is a detailed view of the fuser/cooler module 68 of coating device 62. Referring to FIGS. 4–7, modular coating device 62 includes an upper module 68 with components for coating the top of each sheet 42 and a lower module 70 with components for coating the bottom of each sheet 42. Two print media paths are provided through post print finishing device 64. A coating media path 44 runs through coating modules 68 and 70 and a bypass media path 45 bypasses coating modules 68 and 70. Both media paths 44 and 45 discharge sheets 42 to an output tray 72 (output tray 72 is shown in FIG. 7) or to other downstream finishing operations.

Upper module 68 includes a first/top side coating material web supply spool 12, a first/top side web take-up spool 14, and a first/top side fuser and cooler unit 74. Lower module 70 includes a second/bottom side coating material web supply spool 16, a second/bottom side web take-up spool 18, and a second/bottom side fuser and cooler unit 76. First/top side coating material web 20 runs from top supply spool 12 through fuser and cooler unit 74 to top take-up spool 14 around idler rollers 78 and 80 (web 20 is shown in FIG. 5). Second/bottom side coating material web 24 runs from bottom web supply spool 16 through fuser and cooler unit 76 to bottom web take-up spool 18 around idler rollers 82 and 84 (web 24 is shown in FIG. 5). Top supply and take-up spools 12, 14 and bottom supply and take-up spools 16,18 are positioned over one another to achieve a vertically compact design.

An exit drive roller 86 and associated pinch roller 88 propel media sheets 42 out of coating device 62 toward output tray 72 (output tray 72 is shown in FIG. 7). Each of the rollers in upper coating module 68 are mounted to or otherwise supported by an upper module frame 90. Each of the rollers in lower coating module 70 are mounted to or otherwise supported by a lower module frame 92.

Figure 8:
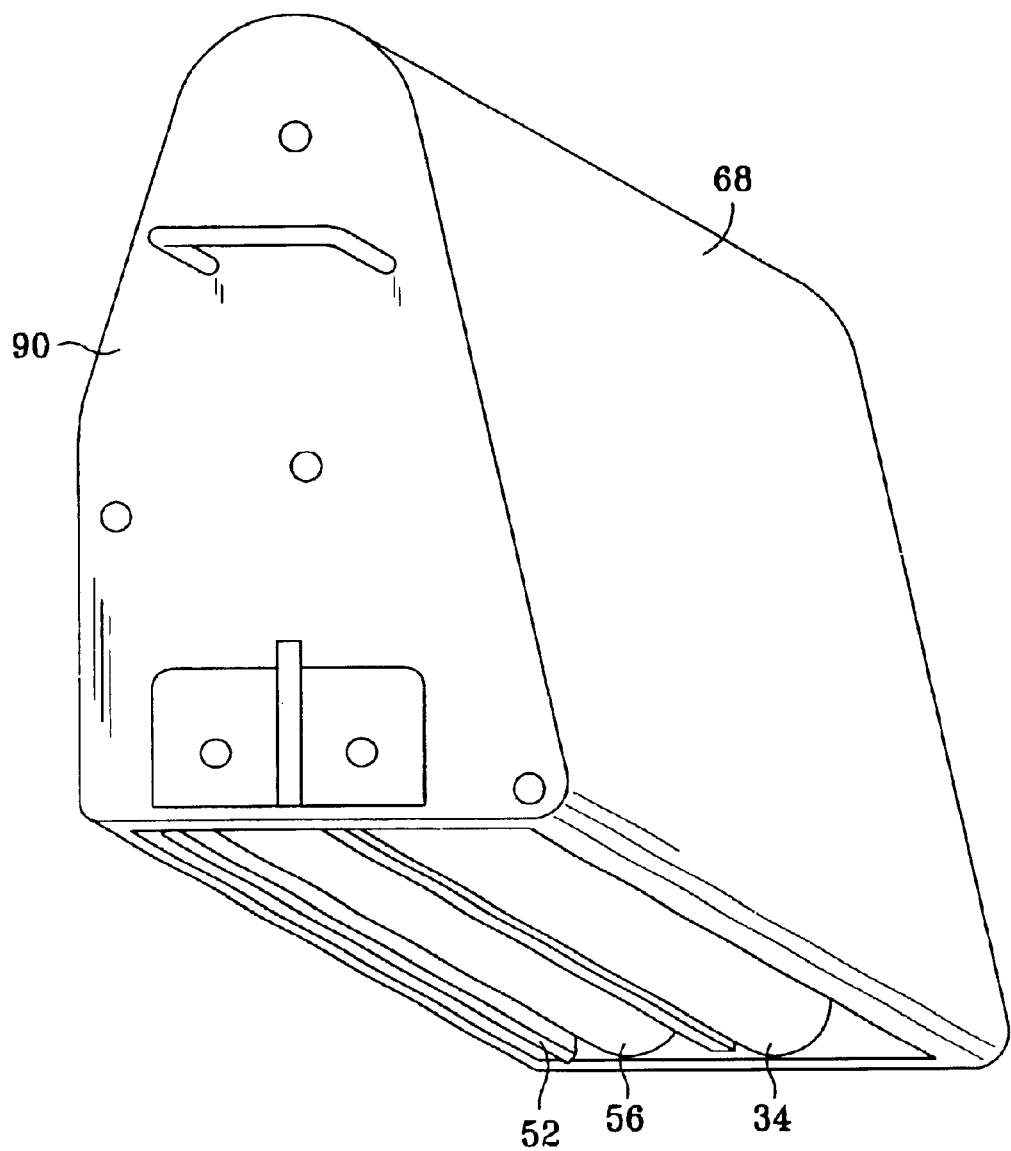
FIG. 8 is a perspective view of an upper/top side-coating module according to one embodiment of the invention.

FIG. 8 is a perspective view of upper module 68. Module 68 and its counterpart lower module 70 are configured to slide into and out of post print finishing device 64 to facilitate installation, repair and replacement of the module.

Figure 10:
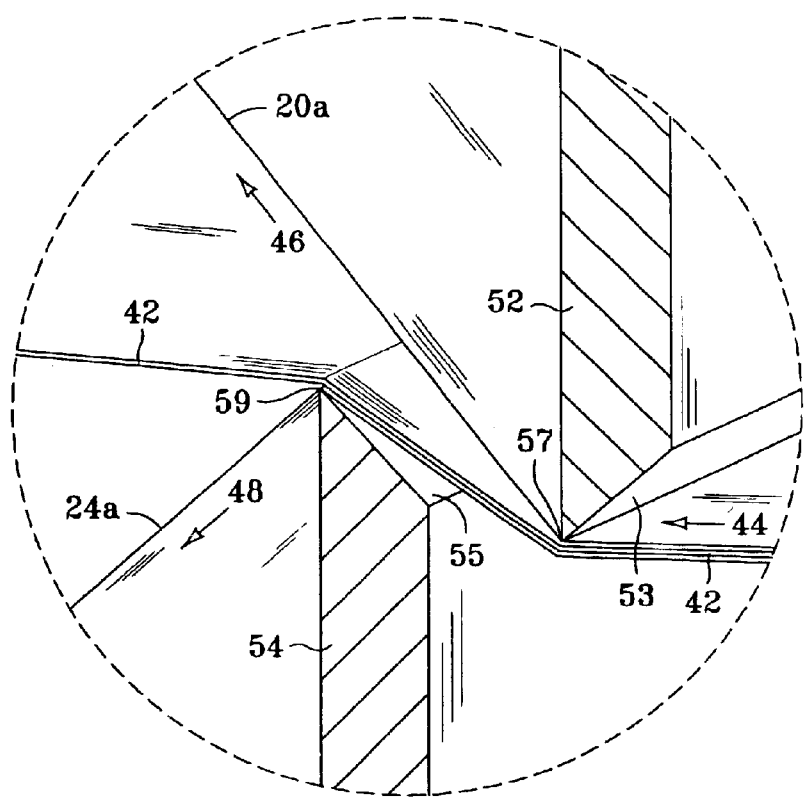
FIG. 10 is a detailed view of the peel bars shown in FIG. 6.
Figure 11:
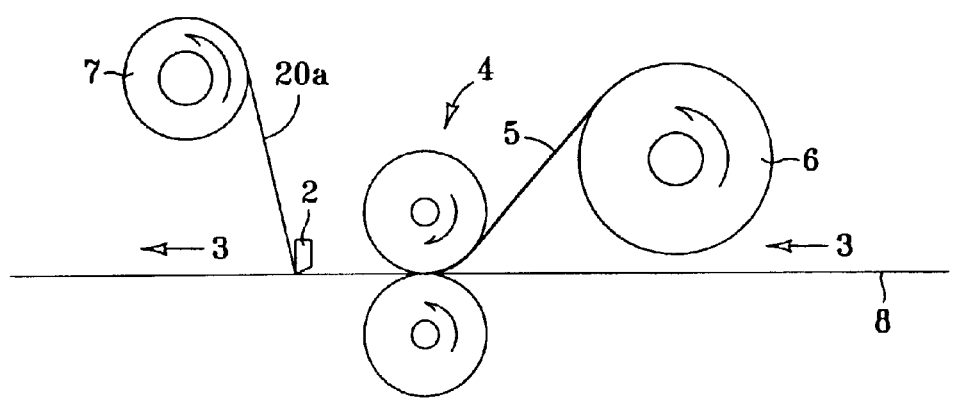
FIG. 11 illustrates a conventional single side coating device.

Referring now to FIGS. 6 and 10, top peel bar 52 is mounted to the housing 75 of top fuser/cooler unit 74. Bottom peel bar 54 is mounted to the housing 77 of bottom fuser/cooler unit 76. Each peel bar 52, 54 includes a web facing surface 53, 55 as shown in FIG. 10. Rigid peel bars with a narrow line of contact against coating webs 20 and 24 are preferred. Hence, in the configuration shown in the drawings, web facing surfaces 53 and 55 are beveled away from the web enough that peel bars 52 and 54 contact the web only along a narrow edge 57, 59 on the downstream side of each peel bar 52, 54, respectively. Because rigid housings can be used to stiffen an otherwise more flexible bar, mounting peel bars 52 and 54 to the fuser cooler unit housings 75 and 77 allows for more variability in the material used to construct peel bars 52 and 54 and the cross-sectional size of the peel bars. Alternatively, the peel bars could be constructed of rigid material having a sufficiently robust cross-section mounted on each end to. frames 90 and 92. The peel bars could also be formed integral to housing 75 and 77. Other suitable configurations that allow peel bars 52 and 54 to intercept webs 20 and 24 uniformly across the width of print media 42 are possible.

The distance along media path 44 between contact edges 57 and 59 of peel bars 52 and 54 and the extent to which peel bars 52 and 54 protrude into media path 44 may be adjusted as necessary or desirable for a particular operating environment. For example, in a typical business office documents are often printed on 24# paper with an inkjet or laser printer. A suitable web for coating such documents is nominally 12–15 μm thick and carries a 3.5–3.8 μm thick film of coating material. In this operating environment, the following spacing will provide suitable performance: approximately 30 mm between contact edges 57 and 59 of peel bars 52 and 54, respectively and contact edges 57 and 59 protruding approximately 3 mm, into media path 44 with facing surfaces 53, 55 beveled away from a slightly radiused or flattened edge 57, 59, respectively. A radiused or flattened edge 57, 59 is preferred to minimize the risk of cutting the web as it peels away from the paper or other print media.

Peel bars 52 and 54 are configured so that the two webs contact both peel bars at all times and so that the peel bars do not damage or impede media sheet 42. The thickness and weight of media sheet 42 may vary significantly. When heavier media sheets 43 are coated, peel bars 52 and 54 may be spaced further apart and may protrude less into media path 44. It is expected that in most operating environments, peel bars spaced apart 20–30 mm and protruding 2–5 mm into the media path will allow for the desired peeling.

The various components of coating device 62 may be directly supported by the frame, such as by mounting a component directly to the frame, or components may be indirectly supported by the frame, such as by mounting a component to a support structure or other component that is mounted to the frame. The frame that supports the components may be a module frame, as in upper module frame 90 and lower module frame 92, an overall coating device frame, or the post print finishing device frame such as might be the case where the coating device is not constructed of modular units that slide into and out of the finishing device.

Figure 9:
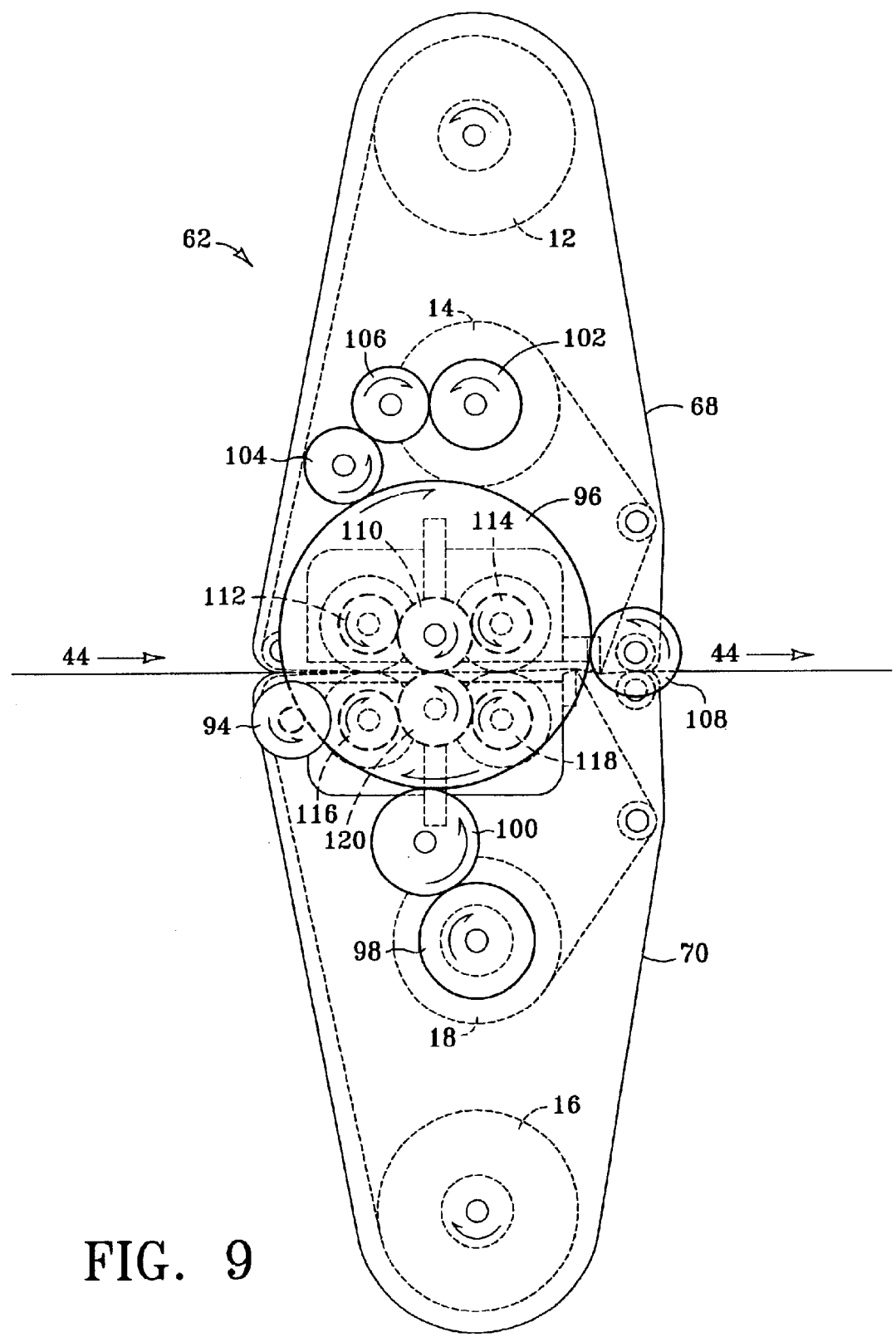
FIG. 9 illustrates a drive train for the driven components of a modular coating device according to one embodiment of the invention.

FIG. 9 illustrates a drive train for driven components of modular coating device 62. In the drive train shown in FIG. 9, all of the major components in media path 44 and web paths 46 and 48 are driven by one motor. Other drive train configurations are possible and two or more motors could be used to drive the various components. Referring to FIG. 9, main drive stepper motor 94 drives main drive gear 96 clockwise. Bottom web take-up gear 98, which is coupled to bottom web take-up spool 18, is driven clockwise off main gear 96 through a spacer gear 100. Top web take-up gear 102, which is coupled to top web take-up spool 14, is driven counter-clockwise off main gear 96 through a pair of reversing spacer gears 104 and 106. Exit drive gear 108, which is coupled to exit drive roller 86, is driven counter-clockwise directly off main gear 96.

Center drive gear 110, which turns coaxially with main gear 96, is driven clockwise at the urging of motor 94 through main gear 96. Top fuser roller gear 112, which is coupled to top fuser roller 34, and top cooler roller gear 114, which is coupled to top cooler roller 56, are driven counter-clockwise off center drive gear 110. Bottom fuser roller gear 116, which is coupled to bottom fuser roller 36, and bottom cooler roller gear 118, which is coupled to bottom cooler roller 58, are driven clockwise off center drive gear 110 through a center spacer gear 120.

Although not shown, the drive train illustrated in FIG. 9 may also include clutches interposed between some of the drive elements as necessary or desirable to maintain the appropriate relationship among moving parts. For example, electro-magnetic slip clutches should be included at take-up gears 98 and 102 to help control the tension on top and bottom coating webs 20, 20a and 24, 24a.

While the present invention has been shown and described with reference to the foregoing exemplary embodiments, it is to be understood that other forms, details, and embodiments may be made without departing from the spirit and scope of the invention that is defined in the following claims.

What is claimed is:

1. A print media coating device, comprising:
   a first web supply;

a first web take-up;
a second web supply;
a second web take-up;
a fuser defining a print media path therethrough;
the first web supply and the first web take-up positioned on a first side of the print media path and the second web supply and the second web take-up positioned on a second side of the print media path opposite the first side;
a first coating material web running from the first web supply, along the print media path through the fuser, to the first web take-up; and
a second coating material web running from the second web supply, along the print media path through the fuser, to the second web take-up;
a first peel bar protruding into the print media path from the first side of the print media path downstream from the fuser; and
a second peel bar protruding into the print media path from the second side of the print media path downstream from the first peel bar.

2. The device of claim 1, further comprising a web cooler defining a continuation of the media path therethrough downstream from the fuser, the first and second coating material webs running from the corresponding web supply, along the media path through the fuser and the cooler, to the corresponding web take-up.

3. The device of claim 2, wherein a distance between the line of contact of the first peel bar and the line of contact of the second peel bar is in the range of 20 mm to 30 mm.

4. The device of claim 1, wherein:
the first web take-up, the first peel bar and the fuser are positioned relative to one another such that the first web bends around the first peel bar on its way to the first web take-up; and
the second web take-up, the second peel bar and the fuser are positioned relative to one another such that the second web bends around the second peel bar on its way to the second web take-up.

5. The device of claim 1, further comprising a web cooler defining a continuation of the media path therethrough downstream from the fuser, the first and second coating material webs running from the corresponding web supply, along the media path through the fuser and the cooler, to the corresponding web take-up.

6. The device of claim 1, wherein the fuser comprises a pair of rollers engagable with one another to form a fuser nip and the fuser nip defines the media path through the fuser.

7. The device of claim 5, wherein the cooler comprises a pair of rollers engagable with one another to form a cooler nip, the cooler nip defining the media path through the cooler and at least one of the rollers being cooled.

8. A print media coating device, comprising:
a frame;
a first web supply spool rotatably supported by the frame proximate a first side of a print media path;
a first web take-up spool rotatably supported by the frame proximate the first side of the print media path downstream from the first web supply spool along a first web path that begins at the first supply spool and ends at the first take-up spool;
a second web supply spool rotatably supported by the frame proximate a second side of the print media path opposite the first side;
a second web take-up spool rotatably supported by the frame proximate the second side of the print media path downstream from the second web supply spool along a second web path that begins at the second supply spool and ends at the second take-up spool;
a fuser supported by the frame, the fuser disposed along the media path, along the first web path between the first supply spool and the first take-up spool, and along the second web path between the second supply spool and the second take-up spool;
a motor drivingly coupled to the first web take-up spool and the second web take-up spool;
the media path, the first web path and the second web path coincident with one another through the fuser;
a first peel bar supported by the frame, the first peel bar disposed along the media path downstream from the fuser and the first peel bar protruding into and extending across the media path and the first web path;
a second peel bar supported by the frame, the second peel bar disposed along the print media path downstream from the fuser and the second peel bar protruding into and extending across the media oath and the second web path; and
the media path, the first web path and the second web path coincident with one another from the fuser to at least one of the peel bars.

9. The device of claim 8, wherein:
the media path, the first web path and the second web path are coincident with one another from the fuser to the first peel bar; and
the media path and the second web path but not the first web path are coincident with one another from the fuser to the second peel bar.

10. The device of claim 8, further comprising a first web spooled on the first web supply spool and a second web spooled on the second web supply spool, each web having a coating film and a carrier carrying the coating film.

11. The device of claim 8, wherein each peel bar comprises a rigid bar extending across the print media path, the bar having a bearing surface protruding into the respective web path, a downstream face oriented substantially perpendicular to the plane of the print media path, and an upstream face that extends away from the downstream face at an angle, the upstream and downstream faces converging at the bearing surface.

12. The device of claim 8, further comprising a web cooler defining a continuation of the media path therethrough downstream from the fuser and upstream from the peel bars.

13. The device of claim 8, wherein the fuser comprises a pair of rollers engagable with one another to form a fuser nip and the fuser nip defines the media path through the fuser.

14. The device of claim 12, wherein the cooler comprises a pair of rollers engagable with one another to form a cooler nip, the cooler nip defining the media path through the cooler and at least one of the rollers being cooled.

15. A print media coating device, comprising:
a frame;
a first web supply spool rotatably supported by the frame proximate a first side of a print media path;
a first web take-up spool rotatably supported by the frame proximate the first side of the print media path;
a second web supply spool rotatably supported by the frame proximate a second side of the print media path opposite the first side;
a second web take-up spool rotatably supported by the frame proximate the second side of the print media path;

a fuser disposed along the media path and supported by the frame, the fuser including a pair of rollers engagable with one another to form a fuser nip defining the media path through the fuser;

a motor drivingly coupled to the first web take-up spool, the second web take-up spool and at least one of the fuser rollers; and first and second peel bars disposed opposite one another across the media path downstream from the fuser and spaced apart from one another along the media path such that one of the peel bars is downstream in the media path from the other peel bar and each peel bar protruding into the media pPath such that the media path bends around the first peel bar and then around the second peel bar.

16. A print media coating device, comprising:

a sheet of print media;

a first coating material web on one side of the sheet, the first coating material web comprising a coating film facing the sheet and a carrier carrying the coating film;

a second coating material web on the other side of the sheet, the second coating material web having a coating film facing the sheet and a carrier carrying the coating film;

a fuser;

a first peel bar on one side of the sheet;

a second peel bar on the other side of the sheet; and a print media path through the fuser and between the peel bars, the first peel bar located downstream in the print media path from the fuser, the second peel bar located downstream in the print media path from the first peel bar and the first peel par engaging the carrier of the first web and the second peel bar engaging the carrier of the second web and each peel bar protruding into the media path such that the media path bends around the first peel bar and then ground the second peel bar.

17. A print media coating device, comprising:

a first web supply;

a first web take-up;

a second web supply;

a second web take-up;

a fuser defining a print media path therethrough;

the first web supply and the first web take-up positioned on a first side of the print media path and the second web supply and the second web take-up positioned on a second side of th print media path opposite the first side;

a first coating material web running from the first web supply, along the print media path through the fuser, to the first web take-up; and a second coating material web running from the second web supply, along the print media path through the fuser, to the second web take-up;

a first peel bar immediately adjacent to the print media path, the first peel bar disposed along the print media path downstream from the fuser on the first side of the print media path;

a second peel bar immediately adjacent to the print media path, the second peel bar disposed along the print media path downstream from the fuser and downstream from the first peel bar on the second side of the print media path; and wherein each peel bar comprises a rigid bar extending across the print media path, the bar having a bearing surface protruding into a respective web path, a downstream face oriented substantially perpendicular to the plane of the print media path, and an upstream face that extends away from the downstream face at an angle, the upstream and downstream faces converging at the bearing surface.

18. A print media coating device, comprising:

a frame;

a first web supply spool rotatably supported by the frame proximate a first side of a print media path;

a first web take-up spool rotatably supported by the frame proximate the first side of the print media path downstream from the first web supply spool along a first web path that begins at the first supply spool and ends at the first take-up spool;

a second web supply spool rotatably supported by the frame proximate a second side of the print media path opposite the first side;

a second web take-up spool rotatably supported by the frame proximate the second side of the print media path downstream from the second web supply spool along a second web path that begins at the second supply spool and ends at the second take-up spool;

a fuser supported by the frame, the fuser disposed along the media path, along the first web path between the first supply spool and the first take-up spool, and along the second web path between the second supply spool and the second take-up spool;

a motor drivingly coupled to the first web take-up spool and the second web take-up spool;

the media path, the first web path and the second web path coincident with one another through the fuser;

a first peel bar supported by the frame, the first peel bar disposed along the media path downstream from the fuser and the first peel bar protruding into and extending across the first web path;

a second peel bar supported by the frame, the second peel bar disposed along the print media path downstream from the fuser and the second peel bar protruding into and extending across the second web path;

the media path, the first web path and the second web path coincident with one another from the fuser to at least one of the peel bars; and wherein each peel bar comprises a rigid bar extending across the print media path, the bar having a bearing surface protruding into the respective web path, a downstream face oriented substantially perpendicular to the plane of the print media path, and an upstream face that extends away from the downstream face at an angle, the upstream and downstream faces converging at the bearing surface.

\* \* \* \* \*

UNITED STATES PATENT AND TRADEMARK OFFICE
CERTIFICATE OF CORRECTION

PATENT NO. : 6,732,780 B1
DATED : May 11, 2004
INVENTOR(S) : Maximo Gayoso

It is certified that error appears in the above-identified patent and that said Letters Patent is hereby corrected as shown below:

Column 1,
Line 25, after "application", insert -- serial no. 10/280,989 -- and delete "under"
Line 30, replace "'897" with -- '989 --

Column 5,
Line 51, after "to" delete "."

Column 7,
Lines 22-27, replace Claim 2 with the following original Claim 2.
    2. The device of Claim 1, wherein each peel bar presents a rigid narrow line of contact with the respective coating material web across a full width of the web.

Column 8,
Line 20, replace "oath" with -- path --

Column 9,
Line 13, replace "pPath" with -- path --
Line 38, replace "ground" with -- around --
Line 49, replace "th" with -- the --

Signed and Sealed this

Twelfth Day of April, 2005

JON W. DUDAS
*Director of the United States Patent and Trademark Office*